April 17, 1951     D. P. DARWIN     2,548,874
RETAINING DEVICE
Filed Oct. 10, 1945
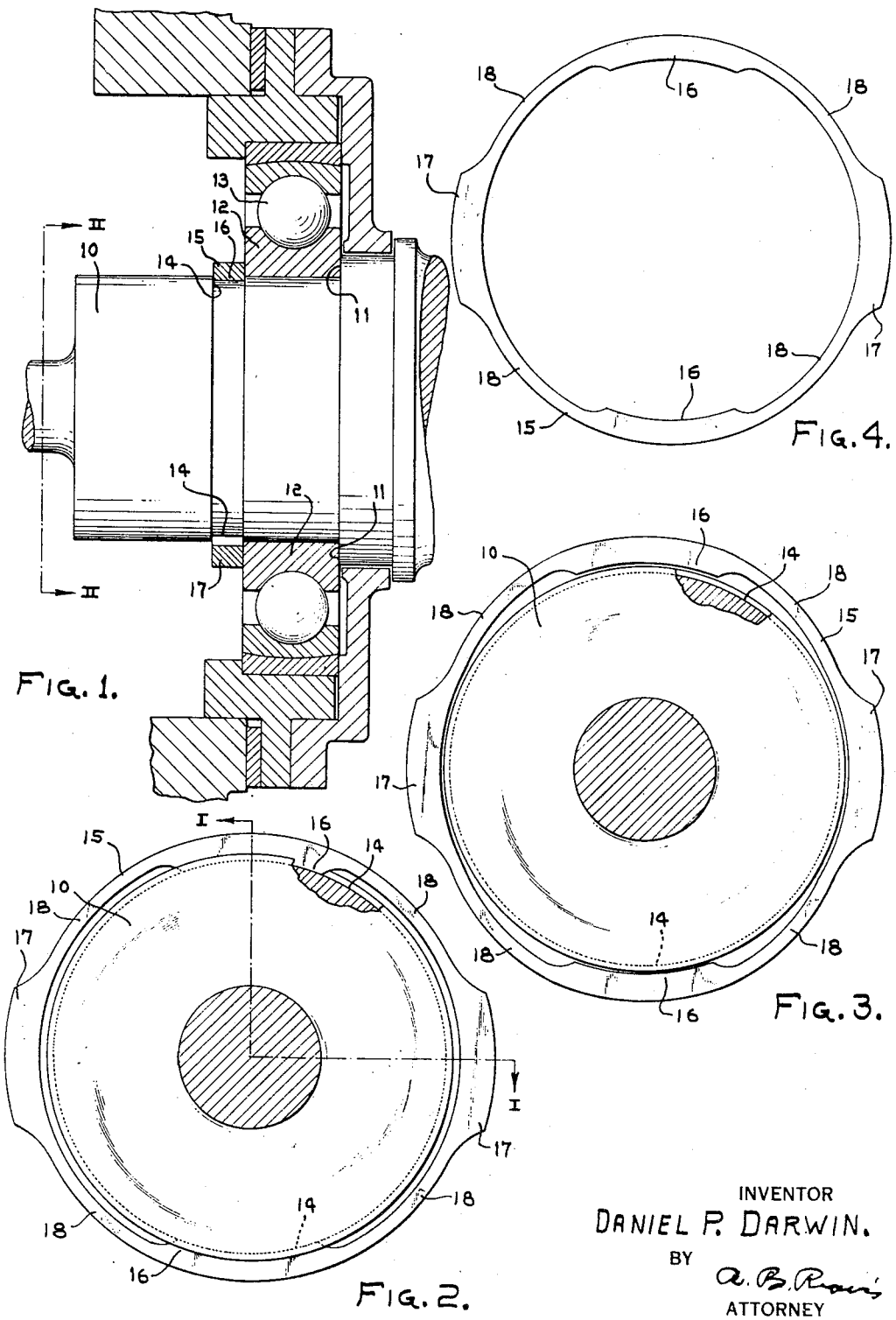
INVENTOR
DANIEL P. DARWIN.
BY
ATTORNEY Patented Apr. 17, 1951

2,548,874

UNITED STATES PATENT OFFICE 2,548,874

RETAINING DEVICE

Daniel P. Darwin, Lansdowne, Pa., assignor to Westinghouse Electric Corporation, East Pittsburgh, Pa., a corporation of Pennsylvania Application October 10, 1945, Serial No. 621,546

1 Claim. (Cl. 85—8.5)

This invention relates to securing means, more particularly to retaining rings, and has for an object to provide improved devices of this character.

Another object of the invention is to provide a retaining ring which is readily applicable to, and removable from, a grooved shaft or similar structure.

Yet another object of the invention is to provide a retaining ring particularly adapted for securing high speed rotary members in position upon shafts.

A further object of the invention is to provide an improved retaining ring in which the retaining action increases with increase in rotational speed of the member retained.

These and other objects are effected by the invention as will be apparent from the following description and claim taken in connection with the accompanying drawings, forming a part of this application, in which:

Fig. 1 is a fragmentary sectional view through a ball bearing assembly utilizing the principle of the present invention and taken along the line I—I of Fig. 2, looking in the direction indicated by the arrows;

Fig. 2 is a sectional view taken along the line II—II of Fig. 1, looking in the direction indicated by the arrows;

Fig. 3 is a view similar to Fig. 2, but showing the retaining ring deformed for application to a grooved shaft; and Fig. 4 is an elevational view of the retaining ring in unflexed condition.

Referring now to the drawings more in detail, there is shown, in Fig. 1, a shaft 10 having a radially extending shoulder 11 against which abuts the inner race 12 of the ball bearing 13. The shaft 10 is provided with the usual groove 14 to the opposite side of the bearing inner race 12 for a reception of the retaining ring 15, to prevent axial movement of the ball bearing inner race away from the shoulder 11 or to the left as viewed in Fig. 1.

The ring 15, as best shown in Fig. 4, has a pair of diametrically-disposed key portions 16 extending radially inward for reception in the groove 14, in the manner illustrated in Fig. 2. It will be noted that the inside diameter of the ring 15 (omitting the key portions 16) is materially larger than the inside diameter of that portion of the shaft 10 which has the groove 14.

The retaining ring 15 likewise carries a pair of diametrically-opposed mass portions 17 positioned substantially 90 degrees from the inwardly directed key portions 16. The remaining portions 18 of the ring 15, between the key portions 16 and the mass portions 17, are flexible or resilient, with the result that when pressure is exerted upon the two lugs or mass portions 17 to move them toward each other, the connecting portions 18 flex with consequent outward movement of the key portions 16 to the positions illustrated in Fig. 3. When in this position, the ring may be freely slipped over the shaft 10 until it is axially aligned with the groove 14, when the pressure may be released and the ring allowed to return to its normal shape, as shown in Figs. 2 and 4. In the latter position, the key portions 16 are partially disposed within the groove 14 to prevent axial movement of the inner ball race 12 away from the shoulder 11.

Preferably, the lugs 17 have a mass slightly greater than the mass of the key portions 16, with the result that the centrifugal forces of the former exceed those of the latter. Consequently, the greater centrifugal forces resulting from the greater masses at the lugs 17 tend to move the latter outwardly with consequent inward movement of the key portions 16, thereby increasing the keying or securing action of the latter.

While it is preferred that the lugs 17 have slightly greater mass than the key portions 16, in order that the former may have greater centrifugal forces than the latter, the same results may be obtained with lugs 17 of no greater mass than the key portion 16 inasmuch as the former are positioned farther from the axis of rotation of the shaft 10 than are the latter, and, inasmuch as the centrifugal force is directly proportional to the product of the mass and radius, the excess radius of the lugs 17 over that of the key portions 16 will produce greater centrifugal forces in the lugs 17.

It will be apparent that the present invention provides a retaining ring which is relatively simple to manufacture, is easily applied and likewise easily removed, as well as one that is highly effective in its retaining action due to the increase in that action upon increase in rotative speed of the shaft with which it is used. Heretofore, with high speed apparatus it has been found desirable to use shrink rings for retaining purposes in situations of this character, such retaining rings being difficult to apply and requiring machining operations consequent to their removal and replacement.

While the invention has been shown in but one form, it will be obvious to those skilled in the art that it is not so limited, but is susceptible of various changes and modifications without departing from the spirit thereof.

What is claimed is:

A retainer ring for axially positioning parts on rotating shafts, comprising an annular portion; a pair of diametrically-opposed key portions extending radially inward from said annular portion; a pair of diametrically-opposed weight portions extending radially outward from said annular portion approximately intermediate said key portions; the sections of said annular portion which are between the key portions and the weight portions being resilient whereby the retaining ring may be flexed at right angles to the diametrically-opposed key portions to increase and decrease the distance between the latter; and the product of the weight and radius of the weight portions being greater than the product of the weight and radius of the key portions whereby the centrifugal forces of the weight portions during rotation of the ring tend to expand said ring in the directions of said weight portions, thereby tending to contract said ring in the directions of the key portions.

DANIEL P. DARWIN.

REFERENCES CITED

The following references are of record in the file of this patent:

UNITED STATES PATENTS

| Number | Name | Date |
|---|---|---|
| 1,091,959 | Pybus | Mar. 31, 1914 |
| 1,134,520 | Dyba | Apr. 6, 1915 |
| 2,401,087 | Brock | June 11, 1946 |
| 2,416,852 | Schaff et al. | Mar. 4, 1947 |
| 2,443,614 | Gray | June 22, 1948 |

FOREIGN PATENTS

| Number | Country | Date |
|---|---|---|
| 457,087 | Great Britain | Nov. 24, 1936 |
| 481,970 | Great Britain | Mar. 22, 1938 |